United States Patent [19]

Rauterberg et al.

[11] Patent Number: 5,052,942

[45] Date of Patent: Oct. 1, 1991

[54] DEVICE FOR ELECTRICALLY CONTACTING A PRINTED CIRCUIT BOARD WITH AN ELECTRONIC CARD, ESPECIALLY AN IC-MEMORY CARD, THAT HAS CONTACTING POLES ALONG ONE OF ITS SIDES

[75] Inventors: Paul-Georg Rauterberg, Wuppertal; Franz-G. Hiemstra, Hellenthal; Horst Ribbeck, Wuppertal, all of Fed. Rep. of Germany

[73] Assignee: Stocko Metallwarenfabriken Henkels und Sohn GmbH & Co., Wuppertal, Fed. Rep. of Germany

[21] Appl. No.: 628,384

[22] Filed: Dec. 14, 1990

[30] Foreign Application Priority Data

Dec. 21, 1989 [DE] Fed. Rep. of Germany ....... 3942289

[51] Int. Cl.[5] .............................................. H01R 13/00
[52] U.S. Cl. .................................................. 439/326
[58] Field of Search ................ 439/296, 326, 629–637

[56] References Cited

U.S. PATENT DOCUMENTS

| 3,848,952 | 11/1974 | Tighe, Jr. ................... | 439/326 |
| 4,128,289 | 12/1978 | Acchipinti .................. | 439/326 |
| 4,737,120 | 4/1988 | Grabbe et al. . | |
| 4,810,203 | 3/1989 | Komatsu ..................... | 439/326 |

FOREIGN PATENT DOCUMENTS 3531318 3/1987 Fed. Rep. of Germany .

Primary Examiner—Joseph H. McGlynn
Attorney, Agent, or Firm—Robert W. Becker & Associates

[57] ABSTRACT

A device for electrically contacting a printed circuit board with an electronic card, especially an IC-memory card, that has contacting poles along one of its sides, comprises a housing, that encloses the electronic card completely and comprises a bottom portion with which the housing is attached to the printed circuit board and a lid portion arranged at an acute angle relative to the bottom portion. After the electronic card is inserted into the housing via an insertion slot, while resting on the bottom portion, the electronic card is pivoted upward until it reaches the underside of the lid portion and is there locked into a fixed position by a locking device.

19 Claims, 4 Drawing Sheets

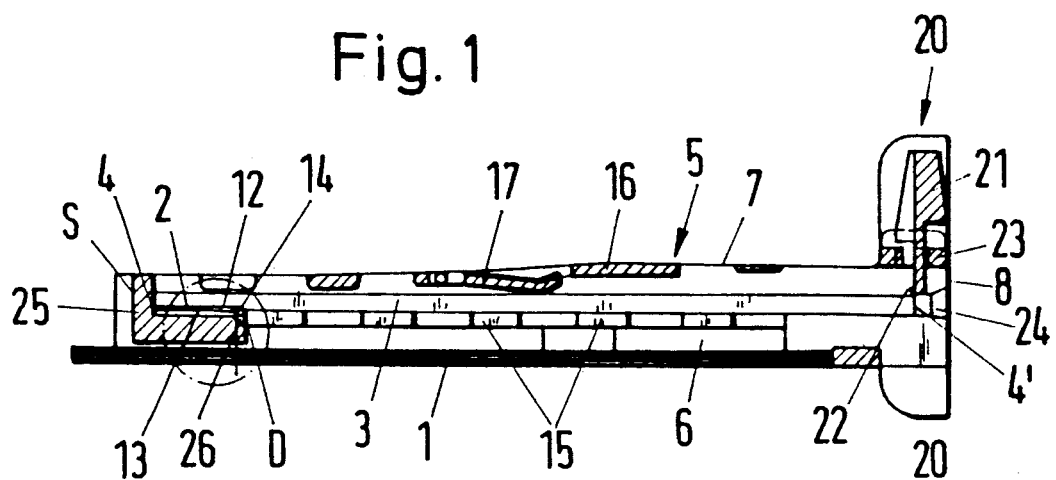
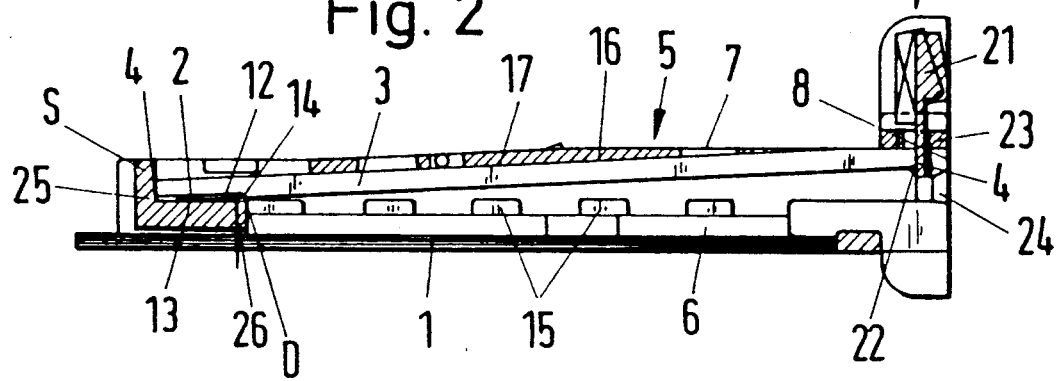
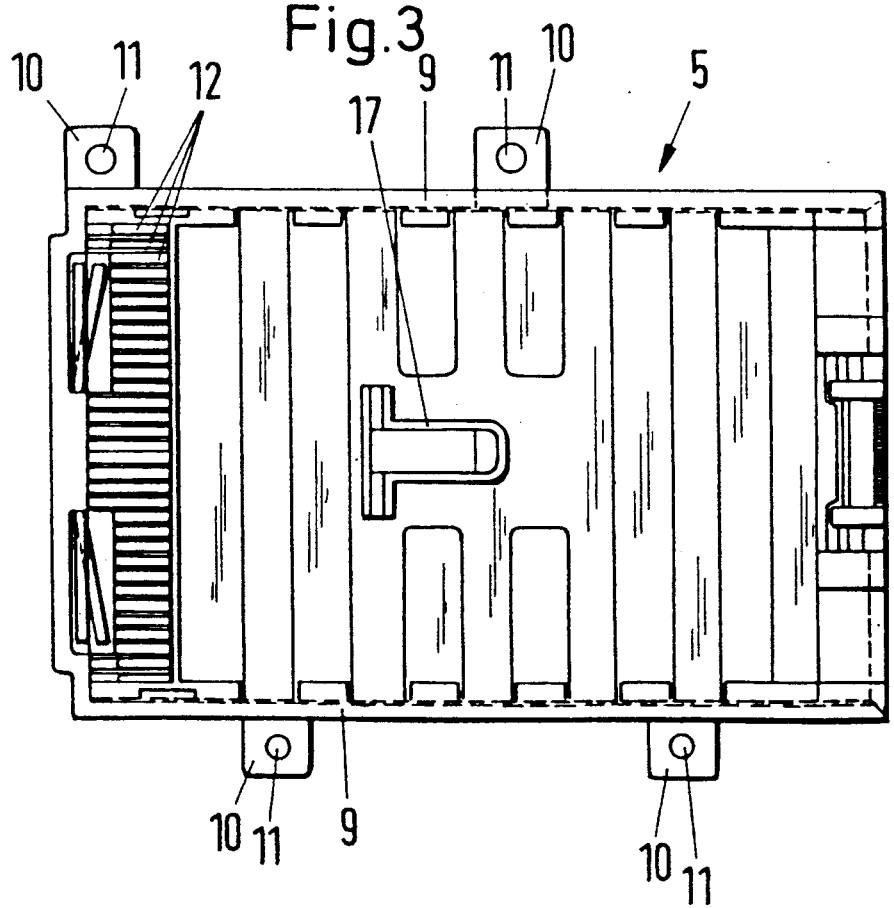

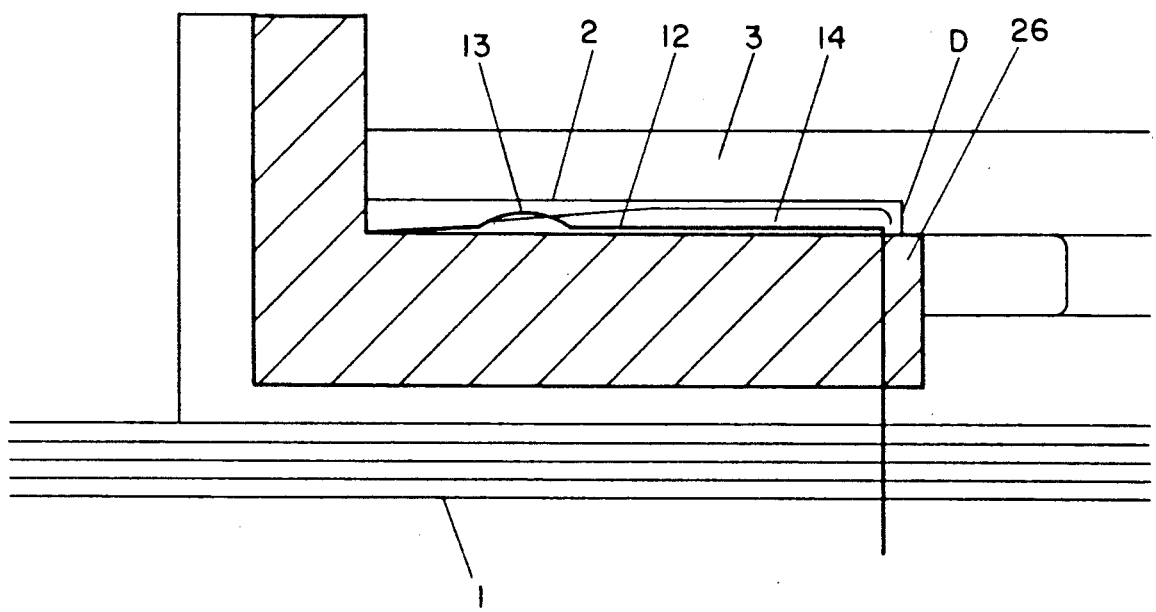
FIG—1a

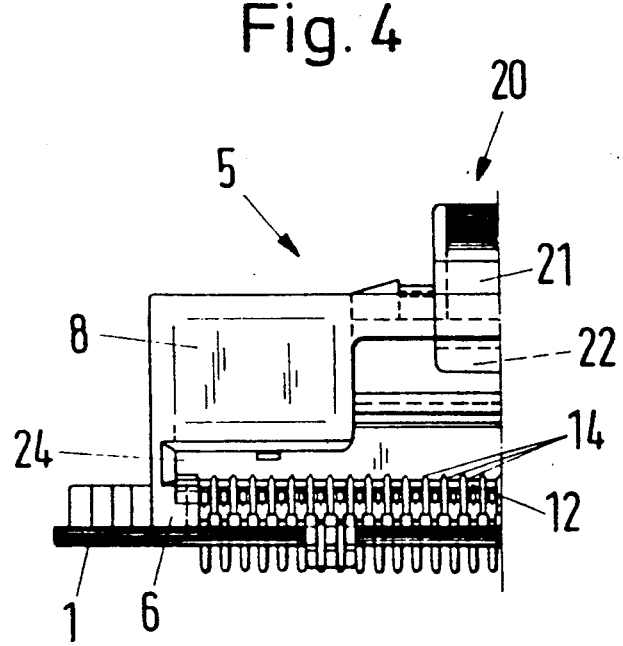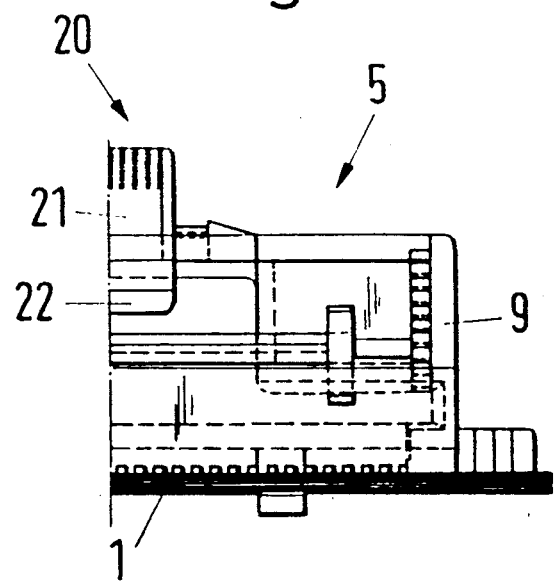

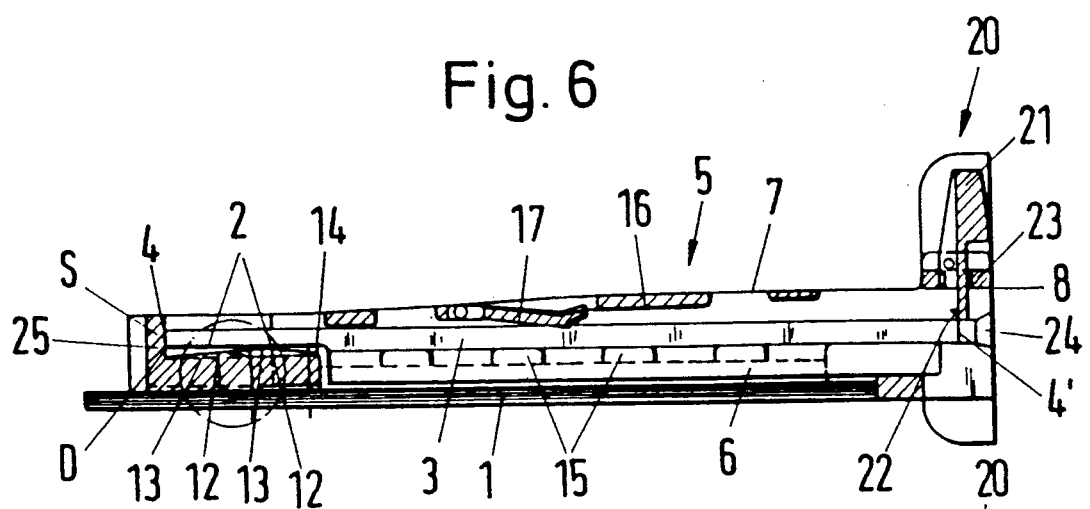
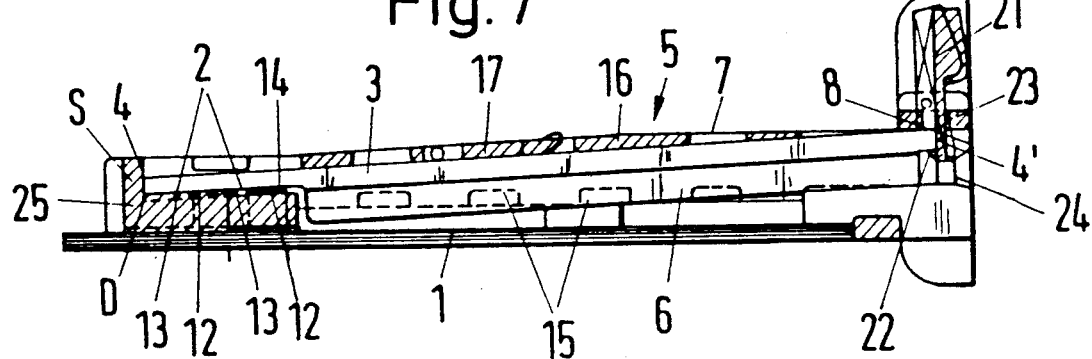
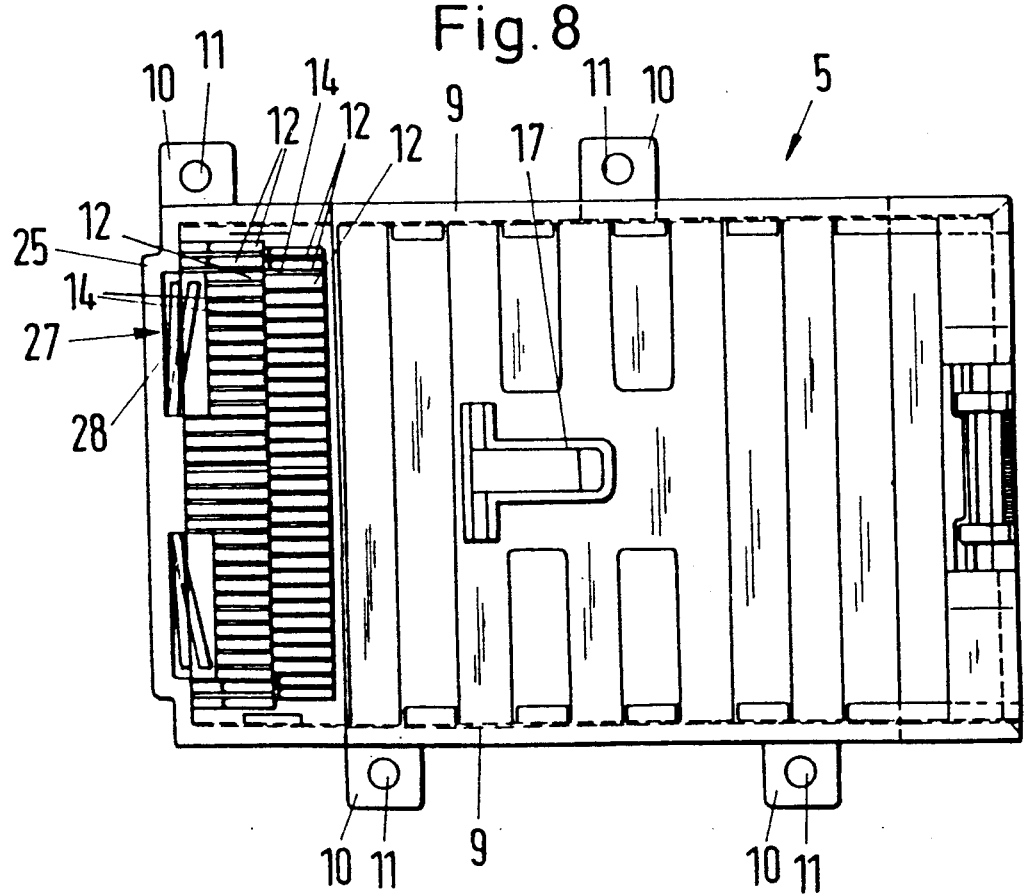

DEVICE FOR ELECTRICALLY CONTACTING A PRINTED CIRCUIT BOARD WITH AN ELECTRONIC CARD, ESPECIALLY AN IC-MEMORY CARD, THAT HAS CONTACTING POLES ALONG ONE OF ITS SIDES

BACKGROUND OF THE INVENTION

The present invention relates to a device for electrically contacting a printed circuit board with an electronic card, especially an IC-memory card, that has contacting poles along one of its sides. The printed circuit board has a housing, comprising a bottom portion and a lid portion and being mounted to the printed circuit board. The electronic card is inserted into the housing, that encloses the electronic card completely in a contacted state thereof, with the contacting poles being inserted first, via an introduction slot provided at a face of the housing. The electronic card is pivotable into a locking position in which contacting of the contacting springs of the housing is achieved, with the contacting springs being arranged opposite the insertion slot in a manner corresponding to an arrangement of the contacting poles of the electronic card, and with the contacting poles, after inserting and before pivoting the electronic card, being without electric contact with the contacting springs.

In the office and data technology and in the computer area etc., so-called IC-memory card are employed. Specific data are saved on those electronic cards which may be processed via a compatible computer system. For this purpose, the IC-memory card is connected to the computer system in order to permit a respective data transfer.

A contacting device for a chip card of the aforementioned kind has been known from DE-OS 35 31 18. This contacting device comprises essentially a parallelepipedal housing having a bottom portion and a lid portion parallel therewith. The face of the housing is provided with an insertion slot for inserting the electronic card to be contacted. Inside the housing, a counterpoise is arranged which extends essentially in the center along the longitudinal direction of the housing and is pivotable about a horizontal axis of rotation. In its initial state, the counterpoise is disposed directly behind the insertion slot so that the inserted electronic card rests on the counterpoise while the contacting poles of the inserted electronic card are not yet in electric contact with the contacting elements of the housing. For the purpose of contacting the counterpoise must be pivoted about its axis of rotation thereby achieving electric contact. At the same time, the counterpoise is locked to the housing.

In this known contacting device for a chip card, it is disadvantageous that, for receiving the electronic card inside the housing, a pivotable counterpoise device is provided. In order to insert the electronic card into the housing, it must be ascertained at all times that the counterpoise is resting directly behind the insertion slot so that a respective device between the counterpoise and the housing must be provided. Furthermore, the arrangement of a pivotable counterpoise inside the housing is technically demanding. Also, due to the positioning of the electronic card in a counterpoise-like fashion inside the housing, this arrangement is potentially instable. This is especially the case when, after a long operation time, the pivot bearing of the counterpoise shows signs of wear and a correct contacting may no longer be achieved. Wear of the pivot bearing may occur, for example, when the electronic card has been inserted and pivoted too hard or too forceful.

Form U.S. Pat. No. 4,737,120 a device for electrically contacting a printed circuit board with an electronic card, that has contacting poles along one of its sides, has been known. The printed circuit board is provided with a one-piece plastic housing. Inside the housing contacting springs are arranged in a row after one another. They correspond to the contacting poles of the electronic card to be inserted. These contacting springs are equipped with contacting pins which are contacted with respective leads on the printed circuit board. Into this housing the electronic card is inserted with "zero force", whereby the contacting poles are inserted first ("zero force" in this context means, that there is no force or only little force required). After the insertion of the electronic card into the housing is completed, the electronic card is pivoted into a locking position and is thus arranged in a fixed position inside the housing, which is equipped with lateral abutting slants for this purpose.

It is disadvantageous in this known device that the electronic card must be inserted into the housing in a slanted manner whereby no predetermined insertion angle is provided by the given design. This means, that it is easily possible for the user of the device to insert the electronic card into the housing such that canting occurs which may cause damage to the contacting springs. Furthermore, when the electronic card is inserted without providing the correct angle, an insertion with "zero force" is impossible. It is also disadvantageous, that the upper end of the electronic card, in its contacting state, extends past the housing, so that the electronic card may be pushed accidentally, or when mishandled, out of the predetermined contacting position resulting in the system malfunctioning.

It is therefore an object of the present invention to provide a device for electrically contacting a printed circuit board with an electronic card, especially an IC-memory card, of the aforementioned kind, in which the insertion of the electronic card into the housing is facilitated and the locking into a fixed position of the electronic card inside the housing after contacting is improved.

BRIEF DESCRIPTION OF THE DRAWINGS

This object, and other objects and advantages of the present invention, will appear more clearly from the following specification in conjunction with the accompanying drawings, in which:

FIG. 1 is a side view of the device after the electronic card to be contacted has been inserted;

FIG. 1a shows an enlarged view of the detail of FIG. 1, which is encircled by a dot-dash line;

FIG. 2 is the device according to FIG. 1 after pivoting and locking the electronic card in its contacting position;

FIG. 3 is a plan view of the device of FIG. 1;

FIG. 4 shows a front view of one half of the device of FIG. 1, viewed from the right;

FIG. 5 shows a side view of one half of the device of FIG. 1, viewed from the left;

FIG. 6 is a side view of a further embodiment having an arrangement of contacting springs in two rows, with the electronic card to be contacted being inserted;

FIG. 7 shows the embodiment of FIG. 6 after pivoting the electronic card upward and locking it in the contacting position; and FIG. 8 is a plan view of the embodiment of FIG. 6.

SUMMARY OF THE INVENTION

The device for electrically contacting a printed circuit board with an electronic card of the present invention is primarily characterized by the lid portion of the housing being arranged at an acute angle relative to the bottom portion and the contacting springs being disposed on the bottom portion along at least one line (zenithal line) that is opposite and parallel to the insertion slot. The electronic card is inserted such that it rests on the bottom portion and subsequently is pivoted upward until abutting the underside of the lid portion. The pivoting axis is in the vicinity of the at least one line (zenithal line) that is opposite and parallel to the insertion slot. (The zenithal line is the joining line between the bottom portion of the housing and the lid portion of the housing.)

A device for electrically contacting a printed circuit board with an electronic card according to the present invention is advantageous, because the electronic card may be inserted without problems into the housing since the electronic card may rest on the bottom portion during the insertion step. This measure assures that the electronic card may be inserted at any time due to its resting on the bottom portion because it is being guided by the bottom portion. Since the contacting springs are arranged on the bottom portion, they may be L-shaped, whereby a first leg rests on the bottom portion and the second leg protrudes the bottom portion and respective bores in the printed circuit board and is soldered to the printed circuit board. The electronic card is inserted until it reaches an abutment which is constituted by the housing and is in the crest area of the housing. For the actual contacting of the contacting poles of the electronic card with the contacting springs of the housing and for the locking of the electronic card into a fixed position inside the housing, it is then only required to pivot the electronic card upward, whereby the crest area of the housing, together with the housing abutment, serves as a pivoting axis. When the electronic card then reaches the underside of the lid portion, which is arranged at a permanent angle relative to the bottom portion of the housing due to the integral design of the housing, the locking of the electronic card in this position is achieved. By resting the electronic card against the underside of the lid-portion and by supporting the front edge of the electronic card in the area of the front housing abutment, respectively, in the area of the pivoting axis, a secure, unchangeable positioning of the electronic card inside the housing, without any instabilities, is achieved.

In a further embodiment, supporting ridges are provided at the bottom portion which are transverse to a direction of insertion of said electronic card. These ridges serve as guides for the electronic card to be inserted and thereby incorrect inserting of the electronic card is avoided. Also, falling of the electronic card into the bottom of the housing is prevented.

In order to prevent breaking of the solder points in the printed circuit board when the electronic card is pushed upward into its final position, at longer sides of the housing, fastening latches, having screw holes and extending perpendicular to the longer sides of the housing, are provided at the bottom portion for fastening the bottom portion to the printed circuit board. The holding force of the housing on the printed circuit board is thus realized via the fastening screws.

Preferably, the fastening latches, on opposite sides of the housing, are staggered relative to one another. Thereby a very high packing density may be achieved.

In a further embodiment, ribs are provided at the bottom portion between the contacting springs, whereby the ribs extend beyond the contacting springs. These ribs create sufficient air and creeping space which, in the inserted position of the electronic card inside the housing, prevents a contacting of the contacting poles with the contacting springs. When the electronic card is subsequently pivoted upward, a defined pitch of spring is thus given which exactly determines the spring force.

In a preferred embodiment, the contacting springs are in the form of leaf springs. Leaf springs are easily manufactured and, in a simple manner, secure the electric contact with the contacting poles of the electronic card.

In another embodiment, strips are provided at the lid portion whereby the strips are arranged perpendicular to a direction of insertion of the electronic card. These strips serve as the abutment for the electronic card when it is pivoted upward into its contacting position.

In a preferred embodiment, a spring arm is provided at the lid portion, which is pressing against the electronic card when the electronic card is in a locked position. Such a spring arm is advantageous because it holds the electronic card with pressure in its contacting and locking position without allowing for play, so that a secure fixation of the contacted electronic card inside the housing is ensured. During unlocking for the purpose of removing the electronic card, the spring arm throws the electronic card back into its insertion position so that the electronic card may be removed without problems.

In a first variant, the spring arm may be an integral part of the lid portion. When the electronic card is pivoted upward, the spring arm of the lid portion is thus prestressed and presses with its free end against the electronic card. Forming the lid portion and the spring arm as one integral part is technically easily achieved.

In another variant, the spring arm is in the form of an swivel arm that is freely pivotable about an axis and is engaged by a spring. In this embodiment of the spring arm, the swivel arm is a separate component which is supported at the lid portion of the housing. A spring disposed between the lid portion and the swivel arm generates sufficient spring tension to transform the swivel arm into a spring arm, which in the locking position presses against the electronic card.

In a preferred embodiment, a locking means for locking the electronic card into a contacting position, in which the electronic card is tilted relative to the bottom portion, is provided having a pivotable lever, with a catch, disposed in the vicinity of the insertion slot of the housing. The lever is preferably disposed at the lid portion. The catch engages an edge of the electronic card and holds the electronic card in contacting position after pivoting the electronic card upward. The locking means in the form of a lever engages the edge of the electronic card which is opposite the edge that is resting against the housing abutment along at least one line (zenithal line) that is opposite and parallel to the insertion slot. Generally it is possible to form the housing and the lever with its catch as one piece so that thereby a torsion catch hook is formed, which may be formed during the injection molding of the housing. As an alternative, it is also possible to design the lever as a separate part and dispose it in a pivotable fashion at the housing, which requires an additional spring for holding the lever in the locking position. An abutment which delimits the pivoting range of the lever is preferably coordinated to either lever of the aforementioned kind. By actuating the lever in a direction opposite the direction of locking the electronic card is released into its insertion position and may then be removed from the housing.

In a preferred alternative, the lever has two arms. This is advantageous because by pressing on the free lever arm which is not equipped with a catch the lever may be pivoted into the unlocking position.

In order to provide a lateral boundary for the electronic card, the housing is provided with side walls.

In a further embodiment, ejecting means for the electronic card are provided at the housing in an area of at least one line (zenithal line) that is opposite and parallel to the insertion slot, which preferably comprises a spring 28 made of plastic or metal. Such ejecting means have the advantage, that, after unlocking the locking means, the electronic card falls downward and is subsequently moved by the ejecting means outward through the insertion slot so that it is possible for the operator to simply grip the electronic card with his fingers. The removal of the electronic card is thereby facilitated by the ejecting means.

In another embodiment, the contacting springs are arranged in a first and in a second row. Preferably, the contacting springs of the first row are staggered by half their width relative to the contacting springs of the second row. It is also possible to have varying staggering distances between the respective rows of contacting springs.

DESCRIPTION OF PREFERRED EMBODIMENTS

The present invention will now be described in detail with the aid of several specific embodiments utilizing FIGS. 1 through 8.

A printed circuit board 1 is a component of a computer system which is not represented in the drawing. The leads of the printed circuit board 1 may be electrically connected to the contacting poles 2 of an electronic card 3 in the form of a so-called IC-memory card in order to achieve a respective data transfer. The contacting poles 2 of the electronic card 3 are arranged in a row one after another along one of the four edges 4 of the electronic card 3.

The contacting device comprises a one-piece plastic housing 5. The housing has a bottom portion 6 and a lid portion 7 with the lid portion 7 being at an acute angle relative to the bottom portion 6. Opposite the zenithal line S the housing 5 is equipped with a face 8, which connects the lid portion 7 with the bottom portion 6. The housing 5 also comprises side walls 9.

The housing 5 is attached to the printed circuit board 1 via the bottom portion 6. For this purpose, the side walls 9 are equipped with fastening latches 10, which are extending perpendicular to the side walls 9. Each of the fastening latches 10 is provided with a screw hole 11, with which the bottom portion 6 of the housing 5 may be screwed to the printed circuit board 1. The fastening latches 10 in the area of the two side walls are staggered relative to the respective fastening latches 10 on the opposite side wall, so that therewith a high packing density may be achieved.

Furthermore, the bottom portion 6 of the housing 5 is attached to the printed circuit board 1 by contacting springs 12, which also form the electric contact to the leads of the circuit board 1. The contacting springs 12 are L-shaped, with a first leg resting on the bottom portion 6 in the longitudinal direction of the housing 5 and with the second leg protruding the bottom portion 6 and respective bores in the printed circuit board 1. The fixation onto the printed circuit board 1 is achieved by soldering the second leg to the underside of the printed circuit board 1 and by doing so the contact with the respective leads of the printed circuit board 1 is achieved. In the area of the free ends of the first legs of the contacting springs 12, the end which is resting on the bottom portion 6, there is a wave-shaped elevation 13 provided. All of the contacting springs 12 of the housing 5 are arranged in a row one after another in parallel. This is shown especially in FIG. 3. Between the contacting springs 12 ribs 14 are provided at the bottom portion 6, whereby the ribs 14 extend beyond the contacting springs 12. The ribs 14 are slanted towards the area of the zenithal line S so that the elevations 13 of the contacting springs 12 extend beyond the slanted portion of the ribs (FIG. 1a).

The bottom portion 6 of the housing 5 is provided with transversely arranged supporting ridges 15, which may be seen in the side views represented in FIGS. 1 and 2. The lid portion 7 is equipped with transverse strips 16. The lid portion 7 is also provided with a spring arm 17, which is formed as an integral part of the lid portion 7 and extends into the inside of the housing 5 when the electronic card 3 is not in contact.

In the area of the free end of the lid portion 7, in the area of the face 8, a locking means 20 is provided. The locking means 20 is formed as an integral part of the housing 5. It comprises a double-armed lever 21 in the form of a so-called torsion catch hook, which, on a free end of one of the lever arms, is provided with a catch 22. On the side opposite the catch 22, the lever arm is coordinated to an abutment 23 of the housing 5.

The device operates as follows: For contacting an electronic card 3, the electronic card 3 is inserted via an insertion slot 24 in the face 8 of the housing 5 into the housing 5 such that the electronic card 3 is sliding on the supporting ridges 15 of the bottom portion 6. The electronic card 3 is inserted, with the contacting poles 2 being inserted first, into the housing 5 until it reaches a housing abutment 25 in the area of the zenithal line S. Because the electronic card 3 has a reduced thickness in the area of the contacting poles 2, the contacting poles 2 in this position of the electronic card 3 are located at a distance above the contacting springs 12 of the housing 5 so that in this position no electric contact is achieved. During the insertion step the spring arm 17 is slightly pivoted. In FIG. 1 the position of the spring arm 17 without a electronic card 3 being inserted as well as with a electronic card 3 inserted is represented.

After the electronic card 3 has been inserted into the housing 5, the electronic card 3 is pivoted upward by the operator with his finger, whereby the pivoting axis is in the area of the zenithal line S and is essentially formed by the axis of rotation D. The electronic card 3 is pushed upward until its top side abuts at the strips 16 of the lid portion 7. In this position three events take place: first, the edge 4' opposite the edge 4 of the electronic card 3 is locked by the catch 22 of the lever 21 thereby achieving the fixation of the position of the electronic card 3; second, the spring arm 17 is pivoted against its spring force into the plane of the lid portion 7 such that the spring arm 17 rests on the top side of the electronic card 3 and the electronic card 3, in return, is pushed downward by the spring arm 17; and third, due to the pivoting of the electronic card 3, contact is made between the contacting poles 2 and the elevations of the contacting springs 12 of the housing 5. As can be seen in FIGS. 1 and 2, a transverse rib 26 of the bottom portion 6, on which the electronic card 3 rests in the area of the transition to its reduced thickness, serves as the axis of rotation D. The electronic card 3 therefore has at least three points of support, i.e., in the area of the locking means 20, via the spring arm 17, and also in the area of the axis of rotation D, so that an equal load distribution is achieved.

In order to remove the electronic card 3 from the housing 5, the free end of the lever 21 (FIGS. 1 and 2) is pushed counter-clockwise so that the catch 22 releases the edge 4' of the electronic card 3. The electronic card 3 then falls downward due to its own weight and also due to the spring force of the spring arm 17, thereby falling into the position as represented in FIG. 1. Since the housing 5 in the area of the zenithal line S is also equipped with an ejecting means 27 comprising two spring 28, which are in the form of leaf springs, the electronic card 3 is pushed outward through the insertion slot 24. (The two springs 28 of the ejecting means have been prestressed and loaded upon inserting the electronic card 3 into the housing 5.) The electronic card 3 may be removed from the insertion slot 24 in the face 8 of the housing 5 without problems.

FIGS. 6 through 8 show an alternative embodiment. It differs form the first embodiment (FIGS. 1-5) in that the contacting springs 12 are arranged in two rows and staggered by half the width of the contacting springs 12. The contacting poles 2 of the electronic card 3 are arranged accordingly. Furthermore, locking is achieved by pivoting the bottom portion 6 of the housing 5 in an upward direction together with the electronic card 3 whereby the electronic card 3 is resting on the bottom portion 6.

The present invention is, of course, in no way restricted to the specific disclosure of the specification, examples and drawings, but also encompasses any modifications within the scope of the appended claims.

What We claim is:

1. A device for electrically contacting a printed circuit board with an electronic card that has contacting poles along one of the sides thereof, having a housing, comprising a bottom portion and a lid portion and being mounted to said printed circuit board, with said electronic card being inserted into said housing, that encloses said electronic card completely in a contacted state thereof, with said contacting poles being inserted first, via an insertion slot provided at a face of said housing, with said electronic card being pivotable into a locking position in which contacting of contacting springs of said housing is achieved, with said contacting springs being arranged opposite said insertion slot in a manner corresponding to an arrangement of said contacting poles of said electronic card, and with said contacting poles, after inserting and before pivoting said electronic card, being without electric contact with said contacting springs, the improvement wherein:

said lid portion is arranged at an acute angle relative to said bottom portion, and said contacting springs are disposed on the bottom portion along at least one line that is opposite and parallel to said insertion slot, with said electronic card being inserted such that said electronic card is resting on said bottom portion during insertion and subsequently is pivoted in an upward direction until abutting an underside of said lid portion, with a pivoting axis being in the vicinity of said at least one line.

2. A device for electrically contacting according to claim 1, in which supporting ridges are provided at said bottom portion transverse to a direction of insertion of said electronic card.

3. A device for electrically contacting according to claim 1, in which ribs are provided at said bottom portion between said contacting springs, with said ribs extending beyond said contacting springs.

4. A device for electrically contacting according to claim 1, in which said contacting springs are in the form of leaf springs.

5. A device for electrically contacting according to claim 1, in which strips are provided at said lid portion with said strips being arranged perpendicular to a direction of insertion of said electronic card.

6. A device for electrically contacting according to claim 1, in which said housing is provided with side walls.

7. A device for electrically contacting according to claim 1, in which said bottom portion of the housing is pivotable in said upward direction together with said electronic card whereby said electronic card is resting on said bottom portion.

8. A device for electrically contacting according to claim 1, in which, at longer sides of said housing, fastening latches, having screw holes and extending perpendicular to said longer sides of said housing, are provided at said bottom portion for fastening said bottom portion to said printed circuit board.

9. A device for electrically contacting according to claim 8, in which said fastening latches, on opposite sides of said housing, are staggered relative to one another.

10. A device for electrically contacting according to claim 1, in which a spring arm is provided at said lid portion which spring arm is pressing against said electronic card when said electronic card is in a locked position.

11. A device for electrically contacting according to claim 10, in which said spring arm is an integral part of said lid portion.

12. A device for electrically contacting according to claim 1, in which a locking means for locking said electronic card into a contacting position tilted relative to said bottom portion is provided having a pivotable lever, with a catch, disposed in the vicinity of said insertion slot of said housing, with said catch engaging an edge of said electronic card and holding said electronic card in said contacting position after pivoting said electronic card upward.

13. A device for electrically contacting according to claim 12, in which said lever is disposed at said lid portion.

14. A device for electrically contacting according to claim 12, in which said lever has two arms.

15. A device for electrically contacting according to claim 1, in which ejecting means for said electronic card are provided at said housing in an area of said at least one line.

16. A device for electrically contacting according to claim 15, in which said ejecting means comprises a plastic spring.

17. A device for electrically contacting according to claim 15, in which said ejecting means comprises a metal spring.

18. A device for electrically contacting according to claim 1, in which said contacting springs are arranged in a first and a second row.

19. A device for electrically contacting according to claim 18, in which said contacting springs of said first row are staggered, by half a width of said contacting springs, relative to said contacting springs of said second row.

* * * * *